(12) United States Patent
Meyer

(10) Patent No.: US 6,551,683 B2
(45) Date of Patent: Apr. 22, 2003

(54) PREFORM FOR MAKING A PROSTHETIC LIMB SOCKET

(76) Inventor: Dennis E. Meyer, 4140 State Rte. 40, Lewisburg, OH (US) 45338

(*) Notice: Subject to any disclaimer, the term of this patent is extended or adjusted under 35 U.S.C. 154(b) by 55 days.

(21) Appl. No.: 09/935,325

(22) Filed: Aug. 23, 2001

(65) Prior Publication Data

US 2003/0039798 A1 Feb. 27, 2003

(51) Int. Cl.[7] .................................................. B32B 3/02
(52) U.S. Cl. ........................ 428/66.7; 428/64.1; 428/67; 428/66.3; 623/926; 623/901
(58) Field of Search .................. 428/67, 64.1, 66.7, 428/66.3, 66.4; 623/27, 926, 901, 33; 264/222

(56) References Cited

U.S. PATENT DOCUMENTS

| | | | |
|---|---|---|---|
| 5,901,060 A | 5/1999 | Schall et al. ........... | 364/468.04 |
| 5,980,803 A | 11/1999 | Slemker et al. ............. | 264/222 |
| 6,106,559 A | 8/2000 | Meyer .......................... | 623/33 |

*Primary Examiner*—Harold Pyon
*Assistant Examiner*—Jane Rhee
(74) *Attorney, Agent, or Firm*—Jacox, Meckstroth & Jenkins

(57) ABSTRACT

A preform for making a prosthetic limb socket includes an injection molded flat circular disk of rigid thermoplastics material, and the disk has a peripheral portion with an embedded reinforcing ring which was spaced as an insert within the mold cavity. The preform is heated within an oven on a flat surface support ring, and the softened disk is manually drawn and stretched downwardly over a positive model of a residual limb while vacuum is introduced through small holes within the model to form a plastic socket which conforms to the positive model. After the plastic cools, the annular base portion of the disk with the embedded reinforcing ring is trimmed from the socket, and the model is removed from the socket.

17 Claims, 1 Drawing Sheet

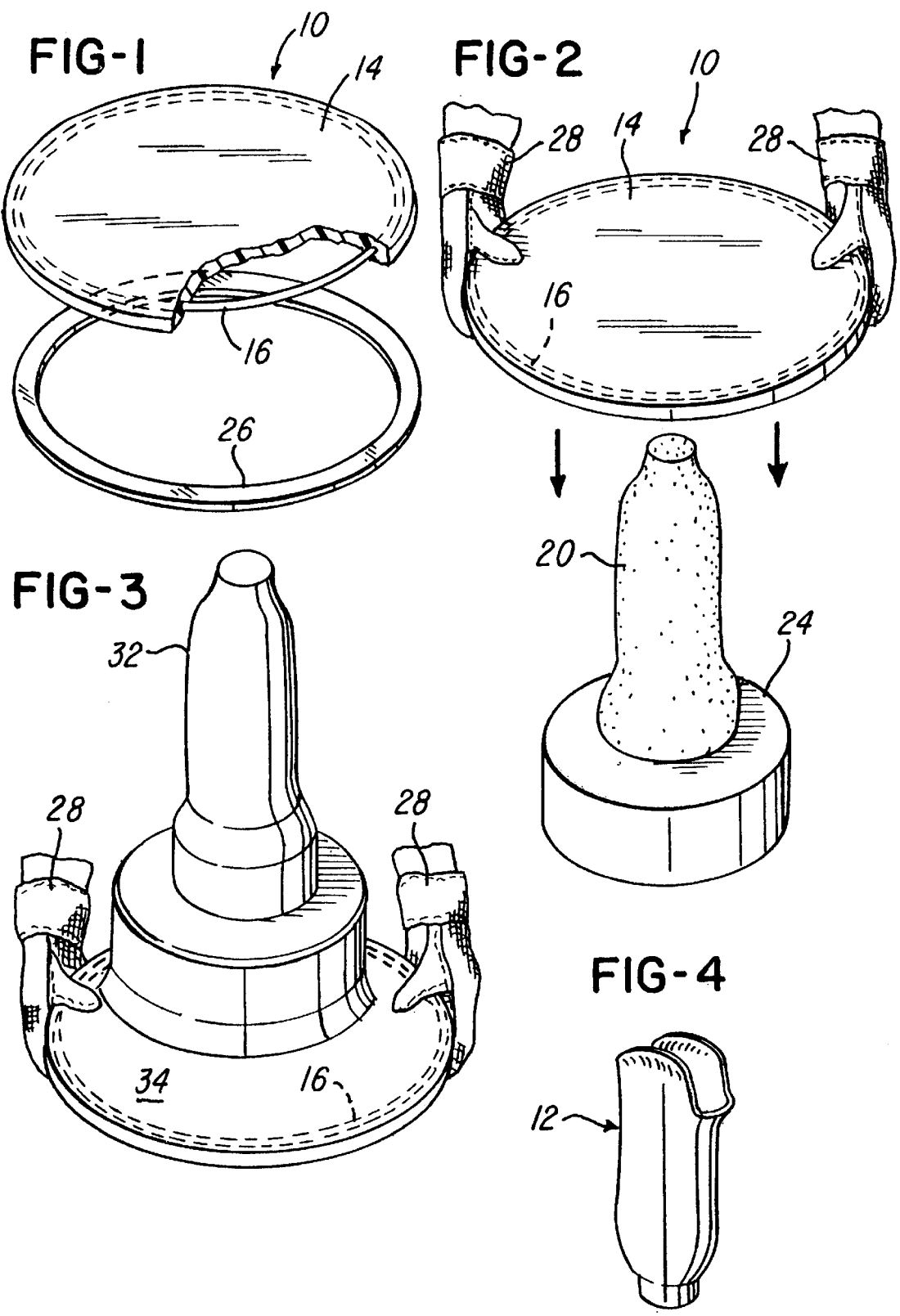

PREFORM FOR MAKING A PROSTHETIC LIMB SOCKET

BACKGROUND OF THE INVENTION

In the production of a substantially rigid plastic socket for receiving the stump or residual limb of a partial amputee, such as, for example, a prosthetic limb socket as disclosed in U.S. Pat. No. 5,980,803, it is common to extrude a large rectangular flat sheet of thermoplastics material and having a predetermined thickness, such as one-half inch, and then cut the sheet into a plurality of smaller square pieces or sheets, for example, 24 inch square sheets. A peripheral portion of a square sheet is clamped within a square metal clamping frame and the square frame and sheet are placed within an oven having a temperature of about 400° F. and until the square plastic sheet softens. The heated square plastic sheet and the attached square frame are then removed from the oven by manually gripping the frame with protective gloves, and the sheet is drawn and stretched downwardly over a hollow positive model of the stump or residual limb.

The positive model is commonly mounted on a vacuum base or pedestal which creates a vacuum within the hollow model and through fine holes or pores within the model while the plastic sheet is stretched over the model to form a socket conforming to the model. The positive model of the patient's residual limb is commonly produced by forming a plaster cast on the patient's residual limb, removing the cast after it hardens and filling the cast with a plaster to make a positive model. The cast is then removed or broken away from the positive model with a pneumatic chisel. A positive model may also be made, for example, as disclosed in U.S. Pat. No. 5,901,060, that is, by using a digitized impression of the residual limb to machine the model. After a socket is formed, it usually receives a coupler such as the socket coupler disclosed in U.S. Pat. No. 6,106,559 which issued to the applicant of the present invention.

It has been determined that the above method for making a socket using a square plastic sheet cut from a larger extruded sheet is expensive and results in producing significant scrap from the sheet, primarily due to the square corner portions of the sheet which are scrapped along with the trimmed base portion of the drawn sheet used to form the socket. Also, the clamping frame for the rectangular sheet is relatively expensive, has a limited service life, and requires significant time to be properly attached to the peripheral portion of the square sheet and then removed from the sheet after the heated sheet is stretched over the positive model. The method of making the square sheet, the corner portions of the square sheet and the significant time required for attaching the clamping frame to the square sheet and removing the frame after forming a socket, add significantly to the cost of producing the socket.

SUMMARY OF THE INVENTION

The present invention is directed to an improved preform for simplifying the making of a prosthetic limb socket and which significantly reduces the cost as well as the time required for making a prosthetic limb socket in addition to minimizing the equipment required for making a socket. In accordance with a preferred embodiment of the invention, a flat circular disk of thermoplastics material is injection molded in a circular mold cavity having a peripheral portion in which a reinforcing ring is positioned so that the reinforcing ring is embedded within a peripheral portion of the molded disk. The plastic disk with the embedded reinforcing ring forms a preform which is heated within an oven at a temperature of about 400° F. and while a peripheral portion of the disk is supported by a flat surface of an aluminum support ring. After the plastics material softens and a center portion of the disk is drooping, the preform is removed from the oven by manually gripping the reinforced peripheral portion of the disk with protective gloves. The preform is then flipped over and moved downwardly over a positive model of a residual limb so that the softened center portion of the disk stretches around the model while a vacuum is applied within the model and through fine or small holes extending through the model to form a plastic socket conforming to the model. After the plastics material cools and becomes rigid, the annular base portion of the disk, including the reinforcing ring, is trimmed from the socket and is discarded.

Other features and advantages of the invention will be apparent from the following description, the accompanying drawing and the appended claims.

BRIEF DESCRIPTION OF THE DRAWING

FIG. 1 is a perspective view of a preform constructed in accordance with the invention and with a portion broken away to show internal construction, and showing a fragment of a support ring exploded below;

FIG. 2 is a perspective view of the preform after it is heated and illustrating the manual movement of the preform downwardly onto a positive model of a residual limb, with the model mounted on a vacuum producing pedestal;

FIG. 3 is a perspective view of a plastic residual limb socket and base portion after the preform is stretched over the positive model shown in FIG. 2; and FIG. 4 is a perspective view of the socket shown in FIG. 3 after an annular base portion of the preform is trimmed from the socket.

DESCRIPTION OF THE PREFERRED EMBODIMENT

FIG. 1 illustrates a preform 10 which is used for making a prosthetic limb socket 12 (FIG. 4) and which includes a circular sheet 14 of a thermoplastics material such as a clear or colored polyethylene. The sheet 14 has a predetermined diameter, for example, 24" inches, and has a predetermined thickness, for example, within the range of ⅜ inch to ⅝ inch, such as ½ inch. The sheet 14 is injection molded within a circular cavity, and prior to injecting the molten plastics material, a rigid reinforcing ring 16 is inserted into a peripheral portion of the mold cavity and is supported within the cavity within the center of the thickness of the sheet 14. Preferably, the ring 16 is formed of cold rolled steel with welded posing ends and has a diameter of about ³⁄₁₆ inch. Thus the ring 16 is embedded with about ⁵⁄₃₂ inch of plastics material both above and below the ring.

When it is desired to form a socket 12, a hollow positive model 20 of the residual limb is made as described above from a rigid disposable material such as plaster and is provided with small holes over its outer surface or is formed from a porous material. The positive model 20 is mounted on a support pedestal 24 in a conventional manner, and the support pedestal either generates or receives a vacuum which evacuates the positive model and sucks air inwardly through the small holes or pores within the model. The circular preform 10 is placed on a flat support ring 26, and the preform 10 and support ring 26 are placed within an infrared or convection oven heated to a temperature of about 400° F. After about 15 to 20 minutes, the plastics material softens, and the center portion of the sheet 14 begins to droop.

The preform 10 and the support ring 26 are then manually removed from the oven by an operator using protective gloves 28 (FIG. 2), and the preform 10 is moved or lowered downwardly onto the positive model 20 while the vacuum is being applied so that the sheet 14 stretches and conforms to the positive model 20 to form a socket preform 32 integrally connected to an annular base portion 34 which encloses the support ring 16. After the plastics material cools, the base portion 34 is cut or trimmed from the socket preform 32, and the positive model 20 is removed from within the socket preform 32 to form the socket 12. As apparent from the drawing, the vacuum pedestal 24 may be made smaller in size so that a smaller diameter preform 10 may be used. This results in a smaller diameter base portion 34 and smaller reinforcing ring 16 which are disposable.

From the drawing and the above description, it is apparent that the making or production of a prosthetic limb socket in accordance with the invention, provides desirable features and advantages. As mentioned above, the circular preform 10 with the circular reinforcing ring 16 embedded in its peripheral portion eliminates the need for the conventional clamping frame and the time required for attaching the frame to a square plastic sheet and for removing the frame from the sheet. The injection molded circular disk 14 also eliminates the scrap corner portions of a square sheet. The preform 10 may also be molded with a minimum diameter according to the size of the positive model 20 and its supporting base or pedestal 24. As a result, the time and cost for making a prosthetic limb socket 12 are significantly reduced.

While the preform and its method of construction herein described constitutes a preferred embodiment of the invention, it is to be understood that the invention is not limited to the precise preform and method described, and that changes may be made therein without departing from the scope and spirit of the invention as defined in the appended claims.

What is claimed is:

1. A preform for making a prosthetic limb socket from a positive model of a residual limb, comprising an injection molded rigid disk of thermoplastics material, a rigid reinforcing ring embedded within a peripheral portion of said disk, said ring having a melting temperature above the melting temperature of said thermoplastic material, and said ring having a width substantially larger than the width of the positive model to facilitate drawing and stretching the disk downwardly over the model after the disk has been heated to a softening temperature.

2. A preform as defined in claim 1 wherein said disk and said ring are substantially circular, and said disk has a generally uniform thickness.

3. A preform as defined in claim 1 wherein said disk has upper and lower surfaces defining a generally uniform thickness, and said ring is positioned substantially equal distance between said upper and lower surfaces.

4. A preform as defined in claim 1 in combination with a support ring having a substantially flat upper surface for supporting said disk within an oven.

5. A preform as defined in claim 4 wherein said support ring comprises a flat metal ring having a substantially uniform thickness.

6. A preform as defined in claim 1 wherein said reinforcing ring comprises a metal wire ring.

7. A preform as defined in claim 6 wherein said disk and said ring are substantially circular.

8. A preform for making a prosthetic limb socket from a positive model of a residual limb, comprising an injection molded generally circular rigid disk of thermoplastics material and having a generally uniform thickness, a rigid generally circular reinforcing ring embedded within a peripheral portion of said disk, said ring having a melting temperature substantially above the melting temperature of said thermoplastic material, and said ring having a diameter substantially larger than the diameter of the positive model to facilitate drawing and stretching the disk downwardly over the model after the disk has been heated to a softening temperature.

9. A preform as defined in claim 8 wherein said ring is positioned substantially equal distance between upper and lower surfaces of said disk.

10. A preform as defined in claim 8 in combination with a support ring having a substantially flat upper surface for supporting said disk within an oven.

11. A preform as defined in claim 10 wherein said support ring comprises a flat aluminum ring having a substantially uniform thickness.

12. A preform as defined in claim 8 wherein said reinforcing ring comprises a metal wire ring having a diameter substantially smaller than said thickness of said disk.

13. A method of making a preform for producing a prosthetic limb socket from a positive model of a residual limb, comprising the steps of forming a mold having a generally flat cavity, positioning within a peripheral portion of the cavity a rigid reinforcing ring having a width greater than the width of the positive model, injection molding a thermoplastics material into the cavity to form a disk having a peripheral portion with the reinforcing ring embedded therein, allowing the disk to cool, and removing the disk and embedded reinforcing ring from the cavity to produce a preform wherein said ring facilitates drawing and stretching the disk downwardly over the model after the disk has been heated to a softening temperature.

14. A method as defined in claim 13 wherein the disk and ring are formed substantially circular.

15. A method as defined in claim 13 wherein the disk is molded with upper and lower surfaces defining a generally uniform thickness, and positioning the ring substantially equal distance between the upper and lower surfaces.

16. A method as defined in claim 13 and including the step of positioning the preform on a support ring having a substantially flat upper surface for supporting the disk within an oven.

17. A method as defined in claim 13 wherein the reinforcing ring is formed as a metal wire ring.

\* \* \* \* \*